Aug. 2, 1932.  H. HEIN  1,870,115

LANDING SAIL FOR AIRCRAFT

Filed Feb. 10, 1932

Inventor:
Hermann Hein
By
Attorney.

Patented Aug. 2, 1932

1,870,115

UNITED STATES PATENT OFFICE

HERMANN HEIN, OF BREMEN, GERMANY

LANDING SAIL FOR AIRCRAFT

Application filed February 10, 1932, Serial No. 592,122, and in Germany February 26, 1931.

Aircraft landing sails are known in which a sail upon which a marine aircraft settles with its floats, is towed from the stern of a ship. With these landing sails there is difficulty in returning the aircraft resting on its floats thereon, back into the water, since with quite low speed of the towing vessel the end of the sail still receives so much upthrust that the aircraft with its floats cannot get free.

The invention consists in the landing sail being provided with an arrangement at the front edge, or at the front edge of the rear part by which it can be flooded during motion so that the marine aircraft floats freely in a few moments. This arrangement operates by the edge in question being caused to dive. For the case where not the whole sail but only the rear part is to be flooded, advantageously a cross slot is provided, which is closed by a flap operable from the ship. By pulling away this flap the cross slot in the sail is opened, and the rear edge having a downwardly directed edge member causes the part of the sail behind the slot to dive which results in immediate flooding.

In the accompanying drawing an example is illustrated in which the rear part of the sail is flooded.

Figure 1:
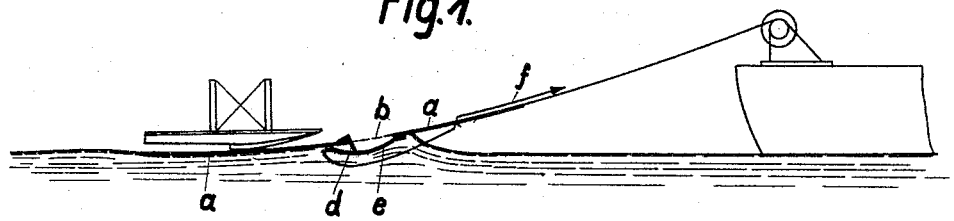
Figure 2:
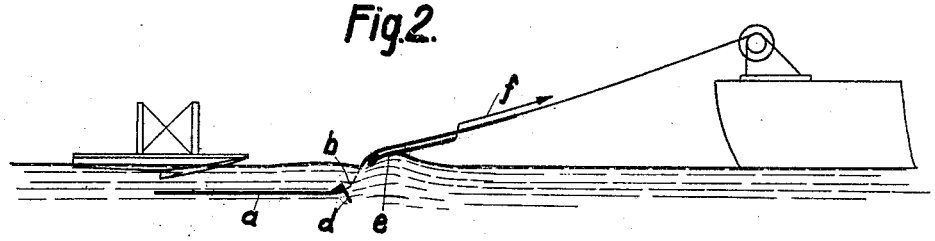

Figure 1 is a side view before flooding,

Figure 2 a side view with the rear part flooded, and

Figure 3:
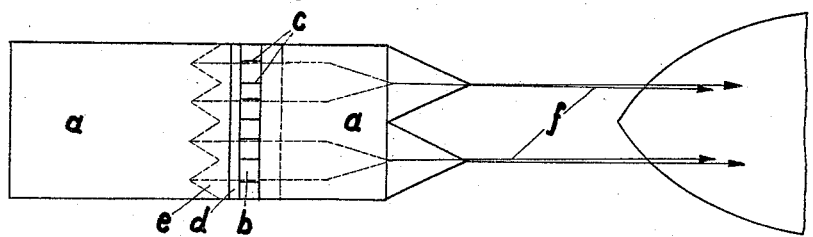

Figure 3 a plan view.

A landing sail $a$ is provided with a flooding slot $b$. The slot is bridged by short connecting lines $c$. At the rear edge of the slot $b$ an inclined edge member $d$ is provided. To the front edge of the slot on the lower side are secured flaps $e$, in this case composed of sail cloth, which can be drawn up by lines $f$ secured to their rear ends. The device is operated by drawing up the flooding flaps $e$ by the lines $f$ at the moment when the aircraft is to take the water. The edge member $d$ causes the sail to dive and a depth of water corresponding with the width of the slot flows over the sail as in Figure 2. If the lines $f$ drawn up for flooding are loosed the flooding flaps swing backwards and cover the slot whereupon the sail rises and the surface is freed of water to receive another aircraft. Accordingly with this device the aircraft can take the water without the towing vessel needing to stop i. e. retaining its controllability against wind and sea. Further the device has the great advantage that an aircraft damaged by the sea can be so to say docked. The damaged aircraft after being secured to a line, can be drawn on to the flooded rear part of the sail. As soon as the flooding flaps are closed the aircraft is lifted out of the water by the sail now able to carry it. This is not possible if a special flooding slot is not provided, but the diving edge made coincident with the front edge of the sail, an arrangement which owing to its simplicity is suitable for certain cases. In this case the lines $f$ are connected directly to the edge member $d$ so that by paying them out with respect to the main hauling lines, the edge can be caused to dive thus flooding the sail.

I claim:

1. A landing sail for aircraft provided with flooding means at the front edge.

2. A landing sail for aircraft provided with flooding means at the front edge of the rear part.

3. A landing sail for aircraft provided with flooding means at the front edge, said flooding means comprising a downwardly inclined edge.

4. A landing sail for aircraft provided with flooding means at the front edge of the rear part, said flooding means comprising a downwardly inclined edge.

5. A landing sail comprising a cross slot, a downwardly inclined member at the rear edge of the slot, and a removable covering adapted to close said slot and hold the flooding means out of action.

In testimony whereof I affix my signature.

HERMANN HEIN.